United States Patent [19]

Long, Jr.

[11] Patent Number: 4,580,719

[45] Date of Patent: Apr. 8, 1986

[54] THERMOSTATIC CONTROL DEVICE

[76] Inventor: Ballard E. Long, Jr., 110 Paris La., Oak Ridge, Tenn. 37830

[21] Appl. No.: 713,487

[22] Filed: Mar. 19, 1985

[51] Int. Cl.⁴ .............................................. F01P 7/02
[52] U.S. Cl. ................................. 236/34.5; 236/48 R; 236/92 R; 236/93 R; 236/101 B
[58] Field of Search ...................... 236/34, 34.5, 48 R, 236/92 R, 93 R, 101 B, 101 C

[56] References Cited

U.S. PATENT DOCUMENTS

| | | | |
|---|---|---|---|
| 1,449,675 | 3/1923 | Heiser | 236/34 X |
| 1,589,779 | 6/1926 | Woolson | 236/34 |
| 1,608,205 | 11/1926 | Franck | 236/34.5 X |
| 1,653,329 | 12/1927 | Woolson | 236/34 |
| 1,870,411 | 8/1932 | Horscroft | 123/327 |
| 2,101,338 | 12/1937 | Lovekin | 251/128 |
| 2,161,924 | 6/1939 | Jack | 236/34 |
| 2,590,112 | 3/1952 | MacCracken et al. | 236/92 R |
| 3,069,125 | 12/1962 | Hewitt, Jr. | 236/48 R X |
| 3,105,472 | 10/1963 | Jasper | 123/41.08 |
| 3,219,141 | 11/1965 | Williamitis | 236/48 R X |
| 3,709,204 | 1/1973 | Noponen | 123/119 B |
| 3,963,042 | 6/1976 | Bible | 137/468 |
| 4,103,824 | 8/1978 | Seifert | 236/34.5 |
| 4,295,602 | 10/1981 | Priesmeyer | 236/48 R X |

Primary Examiner—William E. Tapolcai
Attorney, Agent, or Firm—Luedeka & Neely

[57] ABSTRACT

The specification discloses a thermostatic control device for controlling the flow of a pressurized fluid. A housing having a plurality of flow-through apertures encloses a valve which is movable between a seated and an open position. The valve is operable to be in contact with a valve seat located within the housing when in its seated position and to allow flow through the device in its open position. First and second openings in the housing and valve, respectively, are selectively opened and closed by means of bi-metallic discs operable to change shape upon reaching a predetermined temperature. The bi-metallic discs are disposed within the device so that below the predetermined temperature, the first opening in the housing is open and the second opening in the valve is closed whereby fluid flowing through the device causes the valve to move from its open to its seated position restricting flow through the device. When the temperature of the discs reach the predetermined point, they change shape to cover the first opening and open the second opening whereupon the pressure of fluid within the system causes the valve to move from its seated to its open position allowing flow through the device.

11 Claims, 3 Drawing Figures

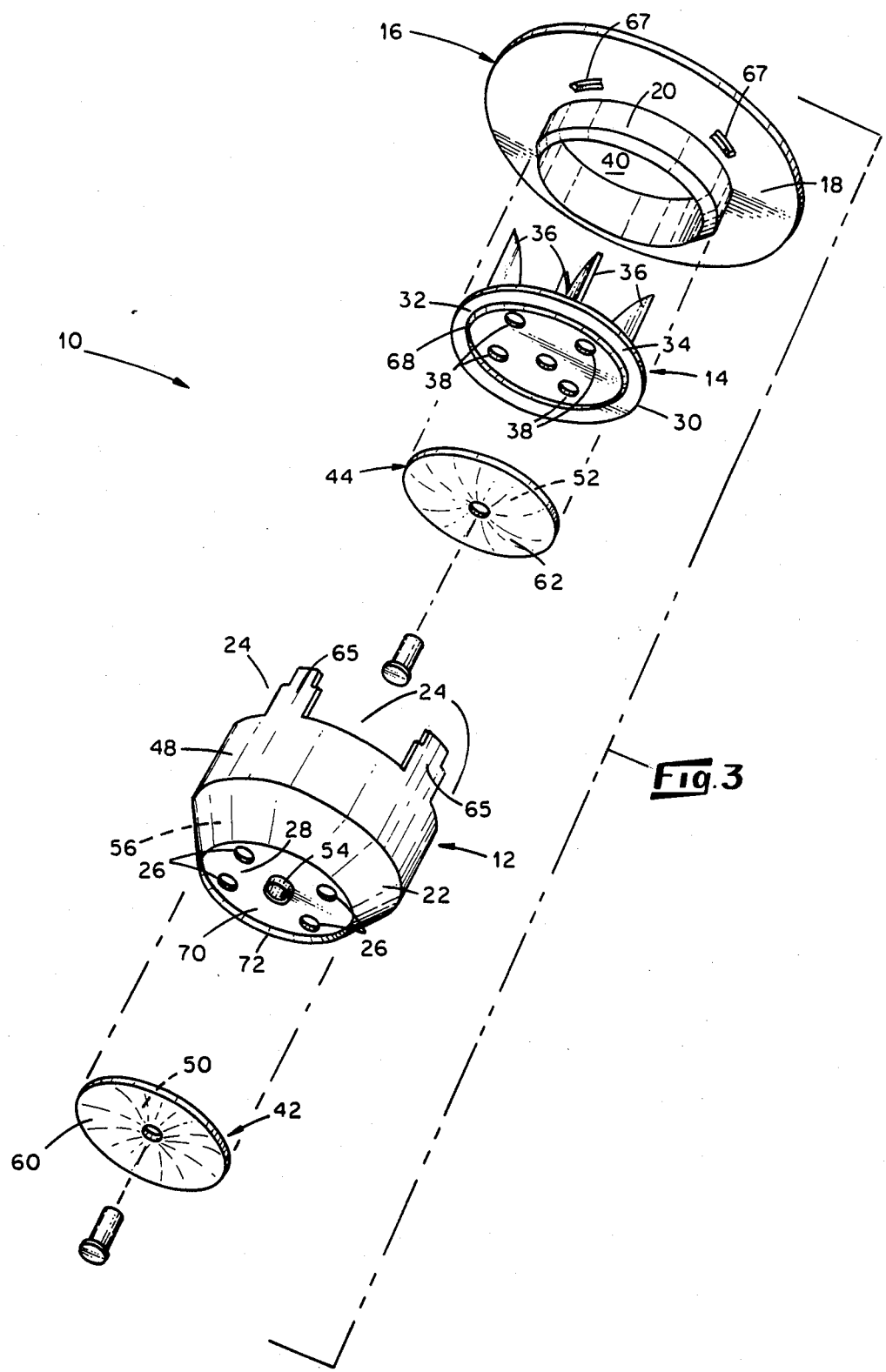

THERMOSTATIC CONTROL DEVICE

This invention relates to devices for thermostatic control of fluid flow and more specifically relates to a thermostat for fluid systems which utilizes the pressure and temperature of the system in combination with a novel arrangement of temperature responsive elements for achieving the desired control.

It is known in the art to control the flow of a fluid using thermostatic control mechanisms responsive to temperature changes of the fluid or system. Such control mechanisms are often self-contained and self-activated and are placed in situ to respond to temperature changes of the fluid or of the surrounding structure (by way of conduction). For example, in the operation of internal combustion engines which have cooling systems, such devices have long been used downstream of a pump to open upon reaching a certain temperature allowing coolant to circulate through selected parts of the system.

In the construction of such devices it has been the usual practice to open the valve mechanism by means of mechanically sealed fluid material subject to thermal expansion and contraction and to close the valve using a spring. Some other devices employ thermally expanding metallic elements for opening the valve. But in all such devices, the power to move the valve from its closed to its open condition, and vice versa, comes from an element of the valve itself. In the sealed fluid-type, for example, the expanding fluid actually moves the valve. Similarly, a bi-metallic element or thermally expanding spring may be used to provide the power for moving the valve.

These ordinary thermostats introduce an additional variable into the cooling system; viz, a separate power source for moving the valve. This additional variable adds another possible site of failure to the system, and it has long been the objective of designers to reduce to a minimum the number of possible elements subject to failure. Moreover, the manufacture of ordinary thermostats involves having to seal a thermally expanding fluid within the device itself. Also, a spring must be placed within the thermostat to return the valve to its closed condition after the thermally responsive fluid has contracted. These steps, and others, require relatively complex manufacturing methods which add to the cost of the ordinary thermostat.

A need has thus arisen for a thermostat capable of controlling the flow of a fluid which does not depend on internal elements for powering movement of the valve, and which can be manufactured less expensively than ordinary thermostats presently in use.

The present invention meets this need and therefore solves the foregoing and other problems long associated with flow control thermostats by proving a novel arrangement of temperature responsive elements and valve structure which eliminates the necessity of having an internally activated means for powering movement of the valve and by using the dynamic and static pressure influences of the fluid to accomplish the same result, thereby eliminating a possible failure site from the system and reducing the cost of manufacturing the device.

In accordance with the present invention, a thermostatic control device for controlling the flow of a pressurized fluid is provided including a housing having a flow-through aperture, a valve seat and a flow outlet. A valve is disposed within the housing and is operable to be moved between an open and a closed position, the flow-through aperture in the housing being in fluid-flow communication with the flow outlet when the valve is in its open position allowing flow through the device. The valve comprises a valve head having first and second oppositely disposed faces and is disposed with the first face of the valve head engaging the valve seat when the valve is in its seated position. A first opening is disposed on the housing to communicate with the second face of the valve head and a second opening is disposed on the valve head to overlie the flow outlet providing fluid flow communication between fluid adjacent the first face and fluid adjacent the second face of the valve head. A first temperature responsive closing element is disposed on the valve head and is operable to be closed and to cover the second opening when the temperature of the first closing element is below a predetermined point and to open and allow flow through the second opening when the temperature of the first closing element reaches the predetermined point. A second temperature responsive closing element is disposed on the housing and is operable to be open when its temperature is below the predetermined point allowing fluid outside the housing to flow through the first opening into the housing, the valve being in its open position and the first temperature responsive element being closed, whereby the pressure loss of fluid flowing through the aperture into the flow outlet exceeds the pressure loss of fluid flowing through the first opening into the housing causing the valve to move to its seated position restricting flow through the device. The second temperature responsive closing element is further operable to close and cover the first opening when its temperature reaches the predetermined point preventing fluid flow communication between fluid outside the housing adjacent the first opening and fluid within the housing adjacent the first opening, the first closing element having opened upon reaching the predetermined temperature, whereby the pressure of fluid adjacent the first face of the valve head causes the valve to move to its open position allowing flow through the device.

In accordance with another aspect of the present invention, the first and second temperature responsive closing elements comprise bi-metallic discs disposed adjacent the second and first openings, respectively. Each disc comprises oppositely disposed convex and concave surfaces.

In accordance with yet another aspect of the present invention, the discs are operable upon reaching the predetermined temperature to change shape so that the convex surface of each of the discs below the predetermined temperature becomes concave when the predetermined temperature is reached, and the concave surface of each of the discs below the predetermined temperature becomes convex.

The advantages and further aspects of the present invention will be readily appreciated by those of ordinary skill in the art as the same becomes better understood by reference to the following detailed description when considered in conjunction with the accompanying drawings in which:

FIG. 3 is an exploded view of an alternate embodiment of the present invention illustrating a preferred method of assembling the elements to form the device.

Figure 1:
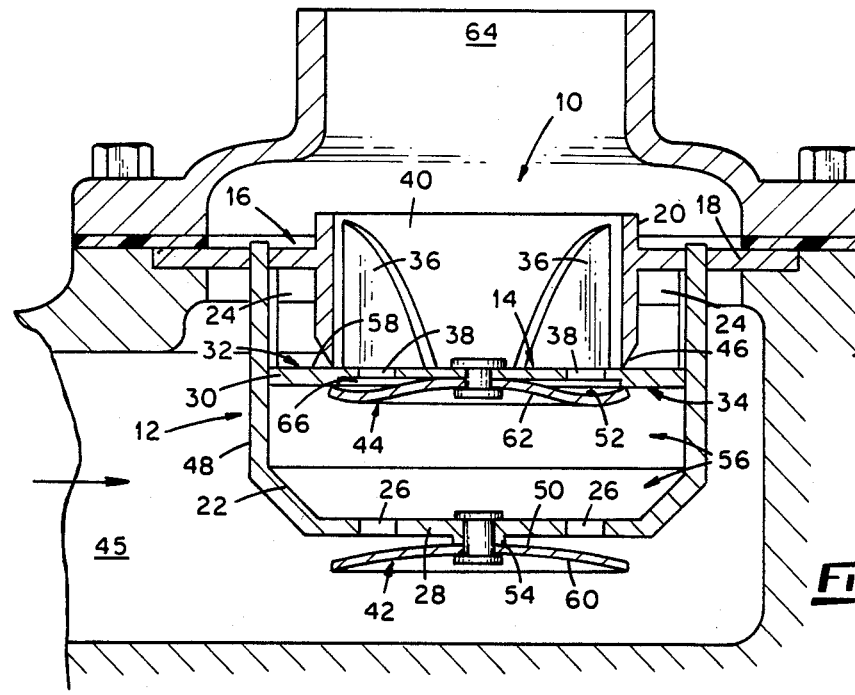
FIG. 1 is a cross-section view of one embodiment of the present invention in its closed position illustrating a housing, a valve, and a pair of bi-metallic discs.
Figure 2:
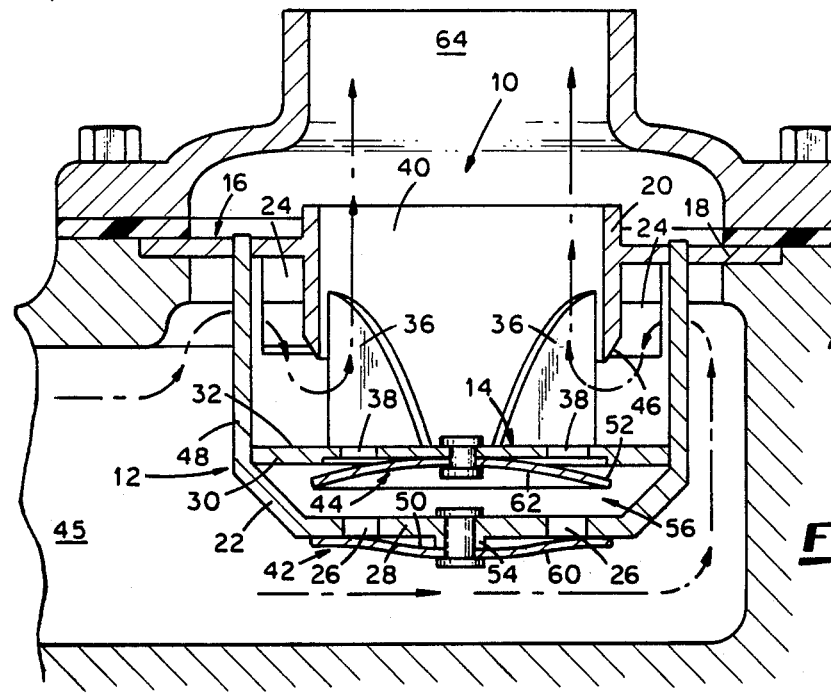
FIG. 2 is a cross-section view of the embodiment of FIG. 1 illustrating the device in its open position.

With principle reference to FIGS. 1 and 2, there is shown a preferred embodiment of the present invention. The thermostat 10 is illustrated in FIG. 1 in its closed configuration and in FIG. 2 in its open configuration. The thermostat 10 generally includes a housing 12, a valve 14, and a base 16. The base 16 is shown to comprise an annular flange 18 and a valve cylinder 20. The housing 12 is generally cylindrical, extending downward from the base 16, and includes a truncated cone end portion 22. A plurality of equally spaced apertures 24 extend around the upper part of the housing 12 in the vicinity of its union with the base 16. Openings 26 are located in a flat part 28 of the end portion 22 of the housing 12. The valve 14 includes a disc-shaped valve head 30 with a diameter of about, but less than, that of the housing 12. The valve head 30 includes a first face 32 (shown facing upwardly in FIGS. 1 and 2) and a second face 34 (shown facing downwardly in FIGS. 1 and 2). A plurality of guide fins 36 extend from the valve head 30 into the valve cylinder 20. The inner wall of the cylinder 20 and the fins 36 cooperate to guide the valve 14 as it moves up and down while maintaining the valve head 30 generally in a plane perpendicular to the longitudinal axis of the housing 12. Openings 38 are disposed in the head 30 of the valve and overlie a flow outlet 40 at the upper end of the valve cylinder 20.

A preferred means for closing the openings 26 and 38 is provided by temperature responsive metallic discs 42 and 44 shown attached generally at the center of the flat part 28 of the housing 12, and the head 30 of the valve 14, respectively. The discs 42 and 44 are temperature responsive in that their shape changes at a predetermined temperature. The discs 42 and 44 are each illustrated having oppositely facing concave and convex surfaces and are operable to "snap" at a predetermined temperature so that a surface which was convex below that temperature will become concave after the disc "snaps" (compare disc 42 in FIGS. 1 and 2). Similarly, the surfaces of the discs 42 and 44 which were concave become convex when the discs 42 and 44 "snap".

In steady-state operating conditions the thermostat 10 is either open or closed and in this respect represents no significant departure from similar devices in the prior art. The present invention, however, utilizes a novel and unique arrangement of temperature responsive elements and structure which allows the force of the fluid already in the system to power movement of the valve 14. Devices in the prior art were dependent on built in internal elements and were therefore relatively unreliable.

With reference to FIG. 1, the thermostat 10 is shown in its closed configuration with the first face 32 of the valve 14 in contact with a valve seat 46. It should be noted that in the arrangement illustrated in FIG. 1, there is existing fluid pressure in a conduit 45. This is the cold running state of the system in which the thermostat 10 is being used. Prior to the initiation of flow through the system, however, the head 30 rests adjacent the junction of the truncated cone section 22 and a cylindrical part 48 of the housing 12. (See, e.g., position of valve 14 in FIG. 2). This is due to the fact that the diameter 48 the valve head 30 is dimensioned to be slightly less than the inside diameter of the cylindrical part 28 of the housing 12 so that the valve 14 moves freely allowing the force of gravity to act on the valve 14 keeping it in this position when there is no fluid in the system.

Upon initiation of flow in the system, fluid approaches the thermostat 10 from the left, as shown in FIGS. 1 and 2, through conduit 45. It is assumed that at this point, the thermostat 10 is below the predetermined opening temperature which is generally about 195° F. for an automobile engine cooling system. The disk 42 on the housing 12 is oriented with its surface 50 adjacent the housing 12 having a convex shape as shown in FIG. 1. The disc 44 adjacent the second face 34 of the valve head 30 is oriented with its surface 52 adjacent the second face 34 having a concave shape as shown. Both discs 42 and 44 are conveniently riveted to the flat part 28 of the housing 14 and to the second face 34 of the valve 14, respectively, at their centers. It is also preferred that the attachment of the discs 44 and 42 be centered on the second face 34 of the valve 14 and the flat part 28 of the housing 12, respectively. Also, the diameters of the discs 42 and 44 should be sufficiently large so that the discs 42 and 44 will cover the openings 26 and 38 when the sides of the discs 42 and 44 adjacent the openings 26 and 38 are concave. And, the discs 44 and 42 are configured so that when the surface of each disc 44 and 42 nearest the valve head 30 and housing 12 is concave, the outer rim of each disc 44 and 42 is in contact around its periphery with the second face 34 of the valve head 30 and the flat part 28 of the housing, respectively. This will insure that no fluid will pass through the openings 26 and 38 when the surfaces of the discs 42 and 44 adjacent the housing 12 and valve head 30 are concave.

The cold fluid enters the housing through openings 26 in the flat part 28 of the housing 12 and through the apertures 24 adjacent the base 16. It is seen that the disc 42 does not obstruct flow through the openings 26 in this mode. The disc 42 is "snapped" away from the openings 26 and is also raised slightly from the surface of the flat part 28 by means of the cylindrical platform 54 to insure adequate flow into the housing 12 through the openings 26. It should be remembered that initially, the valve 14 is open as shown in FIG. 2. Therefore, it is necessary that the force caused by the fluid entering the openings 26 into a chamber 56 against the second face 34 of the valve head 30 be greater than any combined opposing force including any force against the first face 32 of the valve head 30 caused by fluid flowing thereby plus the weight of the valve 14 plus the resistive force of the upward movement of the valve 14 within the cylindrical portion 48 of the housing 12. Unless this occurs, the valve 14 will not move up to its seated position against the valve seat 46 and cut off the flow through the device. But remembering that the diameter of the heat 30 is slightly less than that of the housing 12, there exists a flow passageway between the outer edge of the valve head 30 and the inside of the housing 12. And since the pressure drop of fluid flowing through the apertures 24 into the valve cylinder 20 is greater than that of fluid flowing through the openings 26 into the chamber 56, there is an initial impetus for fluid flow between the edge of the head 30 and the housing 12 from the chamber 56 to the opposite side of the head 30 of the valve 14. The result is that the valve 14 moves upward. Fluid flow around the edge of the head 30 combined with the pressure difference across the head 30 imparts an upward force on the valve 14 which exceeds the weight of the valve. Thus, by virtue of the arrangement of the elements of the thermostat 10, the dynamic and static pressure influences of the cold fluid flowing through the device moves the valve 14 from its open position toward its seated position. It is literally "sucked-up" into contact with the valve seat 46. And the valve 14 remains in contact with the valve seat 46 after flow through the thermostat 10 is terminated. This is due to the fact that under static conditions, the unit pressure on an annular area 58 of the first face 32 of the valve head 30 is equal to the unit pressure on the second face 34 of the valve head 30. But the surface area of the second face 34 in contact with the pressurized fluid greatly exceeds the surface area of the annular region 58 of the first face 32 also in contact with the pressurized fluid resulting in a net upward force on the valve 14 which is opposed by the valve seat 46, so that the valve 14 is held in its seated position.

It should be appreciated that movement of the valve 14 to its closed position is caused by the dynamic and static pressures of the fluid in the system, induced by the pump (not shown). Other thermostats employ variations of an expanding member or sealed expanding fluid and a spring to power movement of the valve member at a predetermined temperature. They are normally closed when the system is below this temperature. The present invention employs a valve mechanism which is initially open and is closed by the phenomena described above without the necessity of a spring or other such device.

After the valve 14 has seated in the manner described above, the fluid upstream of the thermostat 10 and the surrounding structure to which the device is attached begins to increase in temperature by virtue of the heat source (not shown). This increases the temperature of the thermally responsive discs 42 and 44 which are designed to "snap" at the predetermined temperature. The discs 42 and 44 are of the conventional bi-metallic type manufactured with opposite faces comprised of dissimilar metals which have different coefficients of thermal expansion. The discs 42 and 44 are formed to be disposed with oppositely facing concave and convex surfaces so that they are stressed to remain in a given configuration depending on whether they are above or below their "snap" temperature.

The effect of the reversal or "snap" of the discs 42 and 44 can be appreciated by comparing FIGS. 1 and 2. It is seen in FIG. 1 that disc 42 is attached so that its concave surface 60 faces away from the housing 12 allowing fluid to pass into the chamber 56 through the openings 26 when the disc is below the predetermined temperature. Conversely, the disc 44 attached to the valve 14 is oriented so that its convex surface 62 faces away from the valve 14 when it is below the predetermined temperature. The dynamic process of opening the valve 14 then occurs when the discs 42 and 44 "snap" to their reverse orientations as shown in FIG. 2. Since both discs 42 and 44 are preferably designed to "snap" at the same temperature, the movement of the valve 14 is practically instantaneous.

After the discs 42 and 44 reach the predetermined temperature and "snap", there is no longer a significant pressure in chamber 56 because fluid therein is free to move through the opening 38 in the valve head 30 into the flow outlet 40. The force caused by the static fluid pressure adjacent the annular area 58 combined with the weight of the valve 14 then causes the valve to move down to its open position as illustrated in FIG. 2. In this position, fluid passes through the thermostat 10 in the manner depicted by the flow lines in FIG. 2. Moreover, even though there is still a significant pressure drop between the apertures 24 and the flow outlet 40, the valve 14 will not close because there is no pressure differential across the head 30.

Fluid will continue to flow through the thermostat 10 as long as the temperature of the discs 42 and 44 remains above the predetermined point. In this respect, FIG. 2 depicts the "hot" steady-state configuration of the device. If the fluid temperature drops to below the "snap" temperature of the discs 42 and 44, the resulting heat transfer out of the discs 42 and 44 will decrease their temperature to a point where they will "snap" to the configuration shown in FIG. 1 causing the valve 14 to close as described above. Also, should flow through the thermostat 10 be interrupted for some reason, the discs 42 and 44 will remain in their "hot" disposition as in FIG. 2. Then, if flow resumes before the discs 42 and 44 have cooled to below their "snap" temperature, the valve 14 will remain open.

Referring now to FIG. 3, there is shown a preferred method of constructing and assembling the elements of the thermostat 10. The individual components can be mass-produced through standard manufacturing processes and techniques. They are all preferably formed from corrosion resistant metals and because of possible wear problems, the valve 14 should be made of a harder or higher carbon-content steel than the valve cylinder 20. This will prevent the guide fins 36 from wearing down which could allow the valve 14 to become lodged in one position within the housing 12 preventing it from moving freely when the discs 42 and 44 snap.

Viewing FIGS. 1 and 2 in conjunction with FIG. 3, it will be seen that the base 16 includes the valve cylinder 20 and flange 18 extending radially outwardly therefrom. The flange 18 serves both as a support for the thermostat 10, extending into the surrounding structure, and as a partial barrier preventing fluid flow around the device as it is placed within the structure. Also, the flange 18 preferably extends in a plane perpendicular to the axis of the valve cylinder 20 so that the valve cylinder 20 directs flow out of the thermostat 10 generally parallel to a receiving conduit 64 to lessen any outlet flow restrictions. After the valve 14 is placed in the valve cylinder 20, the housing 12 is staked to the flange 18 by insertion of legs 65 into openings 67 spaced around the flange 16 to receive the legs 65. The legs 65 are narrowed at their ends adjacent the flange 18. The narrowed ends are dimensioned to engage the inner walls of the openings 67 after being inserted into the openings 67 a sufficient amount so that the upper tip of each leg extends out of the opposed side of the flange 18. The tip of the narrowed end of each leg 65 is then bradded to permanently secure the housing 12 to the base 16.

The guide fins 36 extending from the valve 14 are equally spaced between the openings 38 which, as can be seen in FIG. 3, are equally spaced on the head 30 to overlie the flow outlet 40. The guide 36 extend up from the first face 32 of the valve head 30 into the valve cylinder 20 by a sufficient amount so that when the valve 14 is in its open position allowing fluid flow through the thermostat 10, the guides 36 continue to restrain any significant lateral movement of the valve 14 within the device. This prevents the valve 14 from binding in the housing 12 in its open position.

Comparing FIG. 1 and FIG. 3, there are shown alternate suitable means for insuring complete contact of the outer edge of the disc 44 with the second face 34 of the valve head 30. In FIG. 1, a recessed area 66 is formed in the approximate center of the second face 34. The disc 44 is attached at its center to the center of the recessed area 66. It can be seen that with this arrangement, when the surface of the disc 44 adjacent the valve head 30 is concave, the peripheral outer edge of the disc 44 is in complete contact with the second face 34 just outside the diameter of the recessed area 66 so that flow through the openings 38 is prevented. In FIG. 3, a contact surface 68 extends out from the second face 34 producing essentially the same result. The recessed area 66 illustrated in FIG. 1 is preferably formed by counterboring the second face 34 when the hole for the rivet is drilled. The contact surface 68 of FIG. 3 is suitably provided as part of the initial construction of the valve 14.

Also shown in FIG. 3 is an alternate means for insuring complete contact of the disc 42 with the housing 12 when the surface 50 of the disc 42 adjacent the housing 12 is concave. A recessed area 70 is centrally located in the end portion 22 of the housing 12. The cylindrical platform 54 is also used in this alternate embodiment to insure unrestricted flow passage through the openings 26 when the surface 50 of the disc 42 adjacent the housing 14 is convex. The openings 26, however, are disposed in the recessed area 70 so that when the surface 50 of the disc 42 is concave, the outer peripheral area will be in contact with a lower edge 72 between the conical part of the end portion 22 and the recessed area 70 preventing flow through the openings 26.

Although particular embodiments of the invention have been described in the foregoing detailed description, it will be understood that the invention is capable of numerous rearrangements, modifications and substitutions of parts without departing from the scope of the invention according to what is claimed below.

What is claimed:

1. A thermostatic control device for controlling the flow of a pressurized fluid, comprising:
   a housing having a flow-through aperture, a valve seat and a flow outlet;
   a valve disposed within said housing, said valve operable to be moved between a seated and an open position, said flow-through aperture in said housing being in fluid-flow communication with said flow outlet when said valve is in its open position allowing flow through the device;
   said valve comprising a valve head having first and second oppositely disposed faces and being disposed with said first face of said valve head engaging said valve seat when said valve is in its seated position;
   a first opening disposed on said housing to communicate with said second face of said valve head;
   a second opening disposed on said valve head to overlie said flow outlet providing fluid flow communication between fluid adjacent said first face and fluid adjacent said second face of said valve head;
   a first temperature responsive closing element disposed on said valve head, said first closing element operable to be closed and to cover said second opening when the temperature of said first closing element is below a predetermined point and to open and allow flow through said second opening when the temperature of said first closing element reaches said predetermined point; and
   a second temperature responsive closing element disposed on said housing, said second closing element operable to be open when the temperature of said second closing element is below said predetermined point allowing fluid outside said housing to flow through said first opening into said housing, said valve being in its open position and said first temperature responsive element being closed, whereby the pressure loss of fluid flowing through said aperture into said flow outlet exceeds the pressure loss of fluid flowing through said first opening into said housing causing said valve to move from its open position to its seated position restricting flow through the device, and operable to close and cover said first opening when the temperature of said second closing element reaches said predetermined point preventing fluid flow communication between fluid outside said housing adjacent said first opening and fluid within said housing adjacent said first opening, said first closing element having opened upon reaching said predetermined temperature, whereby the pressure of fluid adjacent said first face of said valve head causes said valve to move to its open position allowing flow through the device.

2. The thermostatic control device of claim 1, wherein said first and second temperature responsive closing element comprise first and second bimetallic discs, respectively, disposed adjacent said second and first openings, respectively.

3. The thermostatic control device of claim 2, wherein said first and second bi-metallic discs each have oppositely disposed convex and concave surfaces.

4. The thermostatic control device of claim 3, wherein said discs are operable upon reaching said predetermined point to change shape so that said convex surface of each of said discs below said predetermined point becomes concave when said predetermined point is reached, and said concave surface of each of said discs below said predetermined point becomes convex.

5. The thermostatic control device of claim 4, wherein said discs are operable when their temperature decreases from a temperature above said predetermined point to said predetermined point to change shape so that said concave surfaces of said discs above said predetermined point become convex at said temperature and said convex surfaces of said discs become concave.

6. The thermostatic control device of claim 5, wherein said first and second discs are attached at their centers to said housing and said valve head, respectively.

7. A thermostatic control device for controlling the flow of a pressurized fluid, comprising:
   a base;
   a valve cylinder disposed within said base having a valve seat and a flow outlet;
   a housing attached to said base having flow-through apertures located in the vicinity of the attachment of said housing to said base;
   a valve disposed within said housing for movement between a seated and an open position;
   said valve comprising a valve head disposed thereon having first and second oppositely disposed faces with said first face in contact with said valve seat when said valve is in its seated position;
   said valve operable in its open position to allow flow from outside the device through said apertures in said housing to said flow outlet;

a first opening in said housing on the second face side of said valve head;

a second opening disposed in said valve head to overlie said flow outlet;

a first temperature responsive closing element disposed on said valve head adjacent said first opening, said first closing element operable to be closed and to cover said first opening when the temperature of said first closing element is below a predetermined point and to open and allow flow through said first opening when the temperature of said first closing element reaches said predetermined point; and a second temperature responsive closing element disposed on said housing adjacent said second opening, said second closing element operable to be open and allow flow from outside the device through said second opening into said housing when the temperature of said second closing element is below said predetermined point, whereby movement of fluid through the device causes said valve to move from its open position toward its seated position restricting flow of fluid through the device, and operable to close and cover said second opening when its temperature reaches said predetermined point, whereby the forces resulting from the pressure of fluid within the device causes the valve to move from its seated position to its open position allowing flow through the device.

8. The thermostatic control device of claim 7, wherein said valve head has a diameter of about, but less than, the diameter of said housing, allowing fluid flow communication between fluid adjacent said first face of said valve head and fluid adjacent said second face.

9. The thermostatic control device of claim 8, wherein said valve head has a diameter greater than the diameter of said valve cylinder so that when said valve is in its seated position and said first closing element is closed to cover said first opening, an annular area of said first face of said valve head outside of said valve cylinder in contact with pressurized fluid is less than the area of said second face of said valve head in contact with pressurized fluid whereby said valve is held in its seated position restricting flow through the device.

10. The thermostatic control device of claim 9, further comprising:

said first and second temperature responsive closing elements comprising first and second bi-metallic discs, respectively, lach disc having oppositely disposed convex and concave surfaces, said discs being operable upon reaching said predetermined point to change shape so that said convex surfaces of said discs below said predetermined point become concave at said predetermined point, and said concave surfaces of said discs below said predetermined point become convex;

said first disc being attached to said valve head with said concave surface of said disc below said predetermined point adjacent said first opening; and said second disc being attached to said housing with said convex surface of said disc below said predetermined point adjacent said second opening.

11. The thermostatic control device of claim 7, further comprising:

said first and second temperature responsive closing elements comprising first and second bi-metallic discs, respectively, each disc having oppositely disposed convex and concave surfaces, said discs being operable upon reaching said predetermined point to change shape so that said convex surfaces of said discs below said predetermined point become concave at said predetermined point, and said concave surfaces of said discs below said predetermined point become convex;

said first disc being attached to said valve head with said concave surface of said disc below said predetermined point adjacent said first opening; and said second disc being attached to said housing with said convex surface of said disc below said predetermined point adjacent said second opening.

* * * * *

UNITED STATES PATENT AND TRADEMARK OFFICE
CERTIFICATE OF CORRECTION

PATENT NO. : 4,580,719

DATED : April 8, 1986

INVENTOR(S) : Ballard E. Long, Jr.

It is certified that error appears in the above-identified patent and that said Letters Patent is hereby corrected as shown below:

Column 3, line 65, delete "48" and insert -- of --

Column 3, line 67, delete "28" and insert -- 48 --

Column 4, line 54, delete "heat" and insert -- head --

Column 6, line 58, delete "guide" and insert -- guides --

Column 10, line 8, delete "lach" and insert -- each --

Signed and Sealed this

Fifteenth Day of July 1986

[SEAL]

Attest:

DONALD J. QUIGG

Attesting Officer

Commissioner of Patents and Trademarks